(12) United States Patent
Hoff

(10) Patent No.: US 8,757,295 B2
(45) Date of Patent: Jun. 24, 2014

(54) METHOD OF PLANTING A SEED, PLANT, BUSH OR TREE, AND A DRILL

(75) Inventor: Petrus Mattheus Maria Hoff, Roosendaal (NL)

(73) Assignee: Holding P.M.M. Hoff B.V., Steenbergen (NL)

( * ) Notice: Subject to any disclaimer, the term of this patent is extended or adjusted under 35 U.S.C. 154(b) by 0 days.

(21) Appl. No.: 13/512,053

(22) PCT Filed: Dec. 6, 2010

(86) PCT No.: PCT/NL2010/050821
§ 371 (c)(1),
(2), (4) Date: Jul. 26, 2012

(87) PCT Pub. No.: WO2011/068411
PCT Pub. Date: Jun. 9, 2011

(65) Prior Publication Data
US 2013/0042796 A1    Feb. 21, 2013

(30) Foreign Application Priority Data
Dec. 4, 2009 (NL) ..................................... 2003908

(51) Int. Cl.
*A01C 5/04* (2006.01)
*A01G 23/02* (2006.01)

(52) U.S. Cl.
USPC ............................. 175/108; 175/385; 175/394

(58) Field of Classification Search
USPC ............................. 175/385, 394, 391, 108, 56
See application file for complete search history.

(56) References Cited

U.S. PATENT DOCUMENTS

| | | | | |
|---|---|---|---|---|
| 4,098,363 A | * | 7/1978 | Rohde et al. | 175/391 |
| 4,848,489 A | * | 7/1989 | Deane | 175/429 |
| 5,437,336 A | | 8/1995 | Symonds | |
| 5,575,345 A | * | 11/1996 | Shibasaki et al. | 175/108 |
| 6,352,122 B1 | | 3/2002 | Love | |
| 7,093,657 B2 | * | 8/2006 | Johnson, Jr. | 166/286 |
| 2003/0070352 A1 | | 4/2003 | Ellis | |

FOREIGN PATENT DOCUMENTS

WO    WO 2008/084428    7/2008

OTHER PUBLICATIONS

International Search Report from PCT/NL2010/050821, dated Mar. 21, 2011.

* cited by examiner

*Primary Examiner* — Christopher J Novosad
(74) *Attorney, Agent, or Firm* — Swanson & Bratschun, L.L.C.

(57) ABSTRACT

The invention relates to a drill for realizing a partially tapered bore hole in a soil covering a hardpan layer. The drill comprises a rotatable drivable unit that is provided with a carrying structure and a multiple number of cutting elements carried by the carrying structure. The multiple number of cutting elements are arranged along a line extending substantially radially and outwardly from a central axis of the rotatable drivable unit. Further, lower ends of cutting elements in a radial inner section are mainly positioned in a plane transversely to the rotation axis of the rotatable drivable unit. Lower ends of cutting elements in a radial outer section are mainly positioned in a downwardly tapered surface having a symmetry axis coinciding with the rotation axis of the rotatable drivable unit. The lower ends of the cutting elements may subscribe, during rotation, a truncated cone surface.

13 Claims, 15 Drawing Sheets

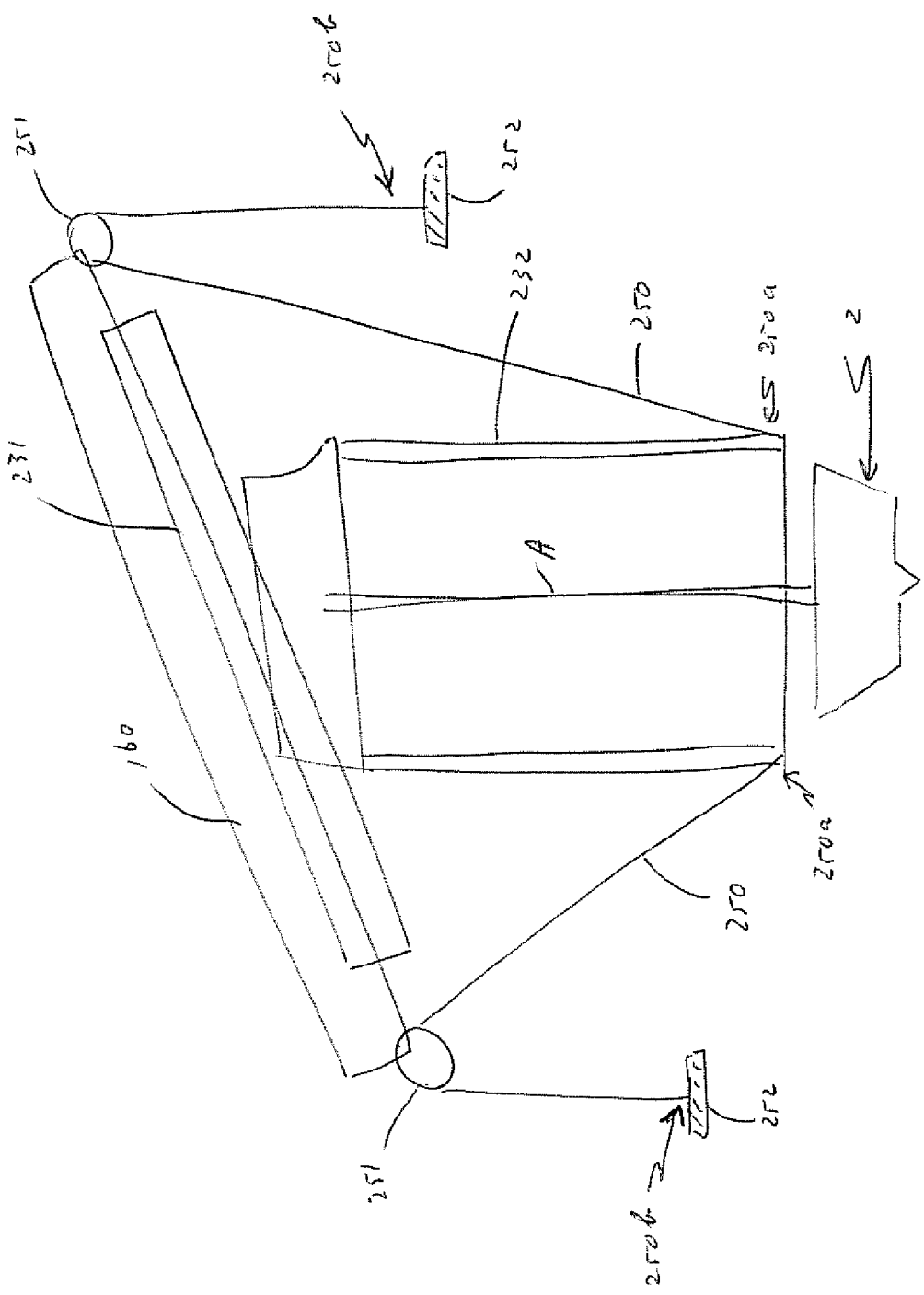

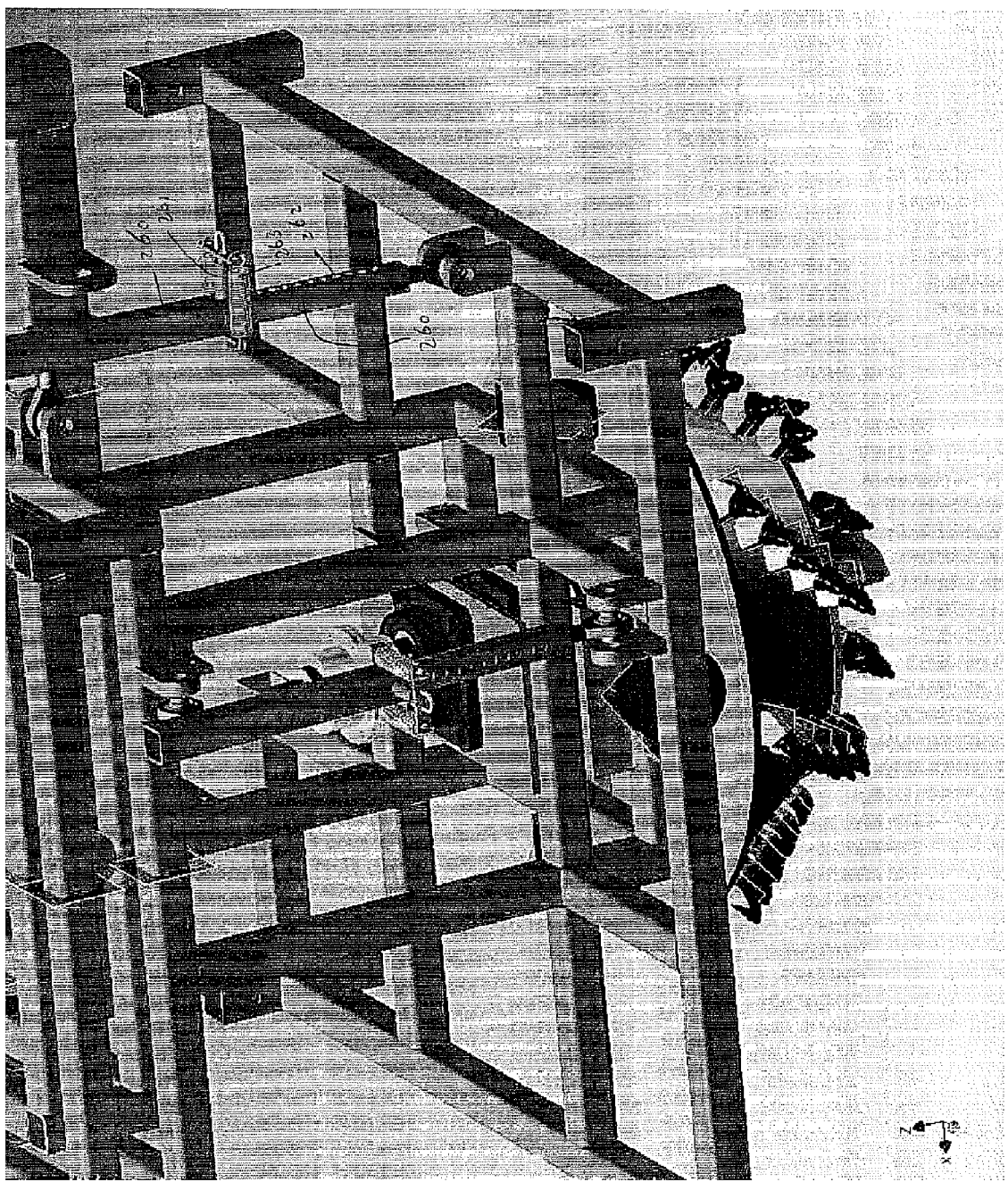

METHOD OF PLANTING A SEED, PLANT, BUSH OR TREE, AND A DRILL

RELATED APPLICATIONS

This application is a 35 U.S.C. §371 national phase application of PCT/NL2010/050821 (WO 2011/068411), filed on Dec. 6, 2010, entitled "Method of Planting a Seed, Plant, Bush or Tree, and a Drill", which application claims the benefit of Netherlands Application No. 2003908, filed Dec. 4, 2009, which are incorporated herein by reference in their entirety.

The invention relates to a method of planting a seed, plant, bush or tree.

In large areas on the earth globe, plants, bushes and trees can not survive due to the lack of water. Such areas include eroded soils, rocks and deserts. In most situations, the top layer is separated from ground water by an impenetrable hardpan layer that blocks the upward capillary transport of water.

It is an object of the invention to provide a drill for realizing a hole in the hardpan layer such that plants, seeds, bushes and/or trees have an opportunity to benefit from the fresh ground water. Thereto, the method of planting a seed, plant, bush or tree includes the steps of drilling a hole in the soil, the hole having downwardly tapered side walls and a substantially flat and horizontal bottom surface, and planting a seed, plant, bush or tree in the substantially flat bottom surface, wherein the step of drilling the hole includes the step of rotating a carrying structure carrying a multiple number of cutting elements, the multiple number of cutting elements being arranged along a line extending substantially radially and outwardly from a central axis, wherein lower ends of cutting elements in a radial inner section are mainly positioned in a plane substantially transversely to the rotation axis, while lower ends of cutting elements in a radial outer section are mainly positioned in a downwardly tapered surface having a symmetry axis coinciding with the rotation axis.

By drilling a hole using a method comprising cutting at positions along a line extending substantially radially and outwardly from a central axis, wherein the hole has downwardly tapered side walls, a relatively large area around the plant, seed, bush and/or tree is available for collecting water that is present in the atmosphere, such as rain water, and providing it to the root structure. The invention is partly based on the insight that the water flows to the central bottom of the hole along the tapered side section of the hole, due to the destroyed capillary structure at the hole surface. Therefore, a relatively large amount of water may moisten the root, thereby presenting surviving opportunities for the plant, seed, bush and/or tree. When the organism grows, the root structure can grow to the ground water level or at least to ground capillary structures that are in fluid connection with the ground water, thereby providing further growing opportunities.

Preferably, the drilling step includes drilling a hole through a hardpan layer, thereby providing that the root structure of the plant, seed, bush and/or tree has access to ground under the hardpan layer.

Further advantageous embodiments according to the invention are described in the following claims.

The invention also relates to a drill. According to an aspect of the invention, the drill comprises a rotatable drivable unit that is provided with a carrying structure and a multiple number of cutting elements carried by the carrying structure, the multiple number of cutting elements being arranged along a line extending substantially radially and outwardly from a central axis of the rotatable drivable unit, wherein lower ends of cutting elements in a radial inner section are mainly positioned in a plane substantially transversely to the rotation axis of the rotatable drivable unit, while lower ends of cutting elements in a radial outer section are mainly positioned in a downwardly tapered surface having a symmetry axis coinciding with the rotation axis of the rotatable drivable unit.

Further, the invention relates to a vehicle comprising a multiple number of drills.

By way of example only, embodiments of the present invention will now be described with reference to the accompanying figures in which FIG. 1 shows a schematic perspective view of a drill according to the invention;

FIG. 15a shows a schematic view of the frame of FIG. 13 from below;

FIG. 15c shows a schematic view of a further alternative frame; and

It is noted that the figures show merely preferred embodiments according to the invention. In the figures, the same reference numbers refer to equal or corresponding parts.

Figure 1:
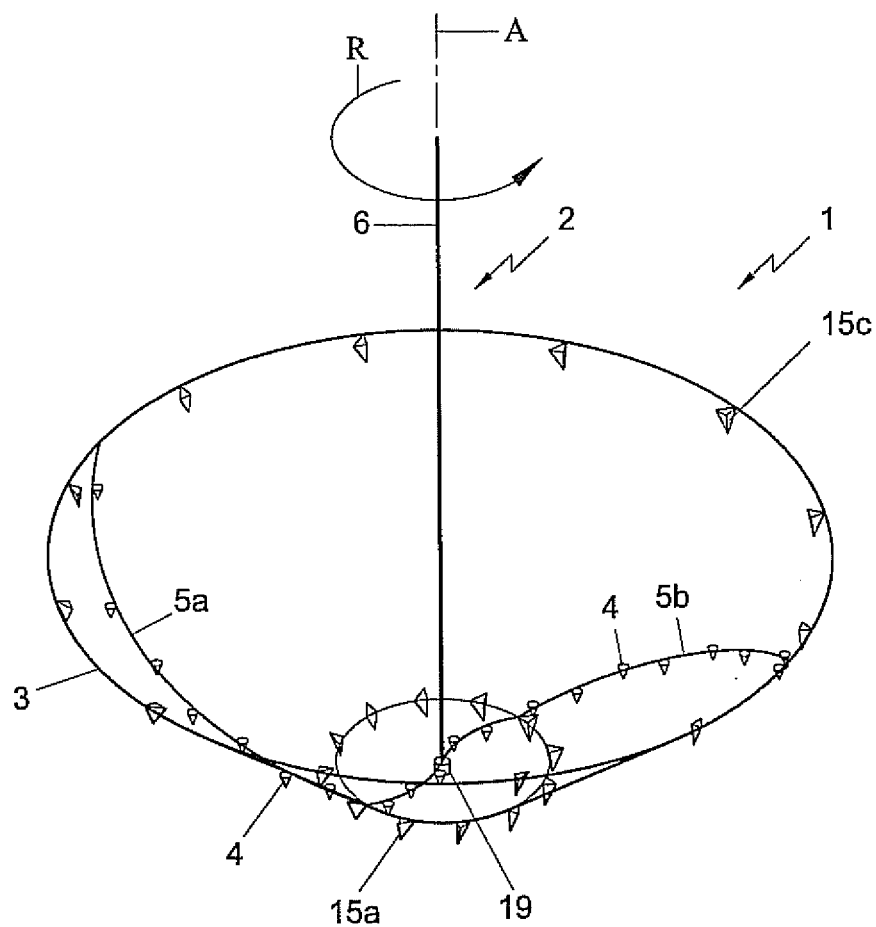
Figure 2:
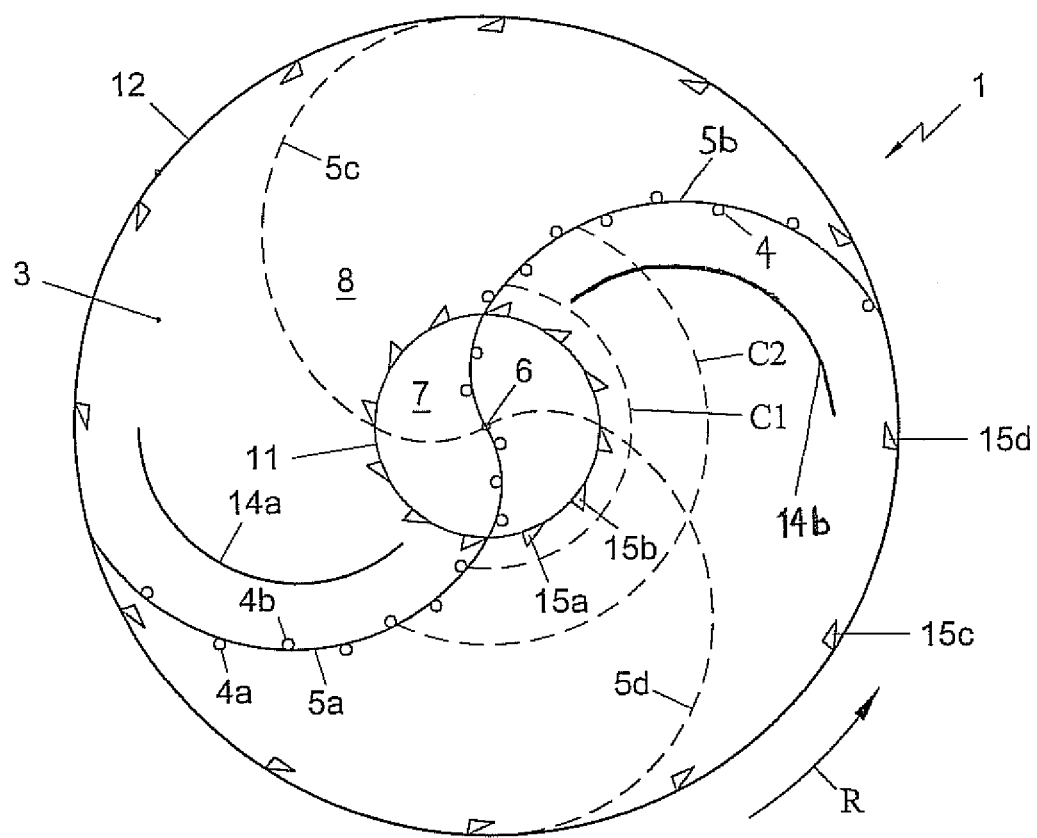
FIG. 2 shows a schematic top view of the drill shown in FIG. 1.
Figure 3:
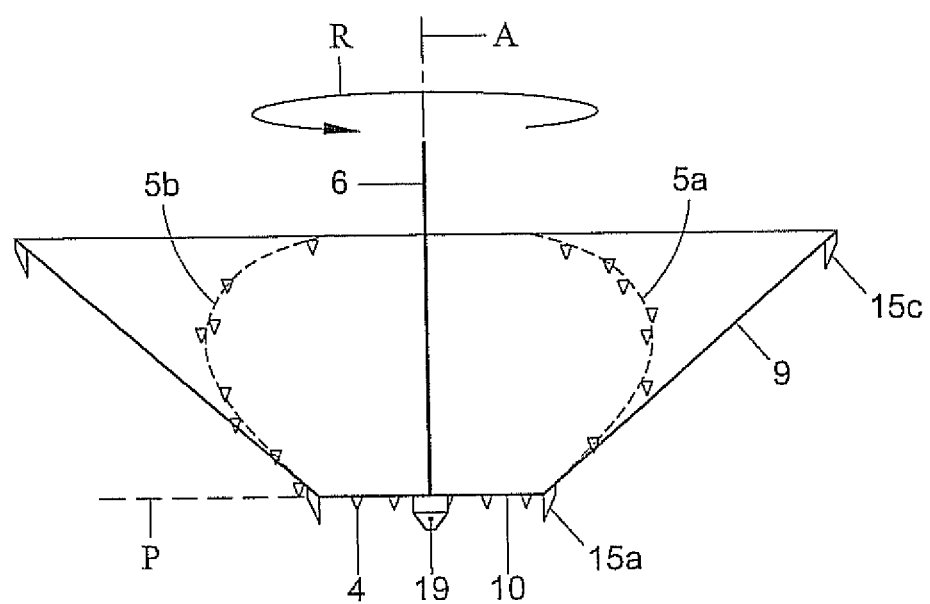
FIG. 3 shows a schematic side view of the drill shown in FIG. 1.

FIG. 1 shows a schematic perspective view of a drill 1 according to the invention. FIGS. 2 and 3 show a schematic top and side view of the drill, respectively. The drill 1 comprises a rotatable drivable unit 2 that is provided with a carrying structure 3 and a multiple number of cutting elements 4 carried by the carrying structure 3. The carrying structure 3 may e.g. include a truncated cone surface and/or a tube frame whereon the cutting elements 4 are arranged. The unit 2 is driven in a rotation direction R with respect to a rotation axis A for releasing ground particles in order to realize a partially tapered bore hole in a soil covering a hardpan layer. The multiple number of cutting elements 4 are arranged along a line 5a,b extending substantially radially and outwardly from a central axis A of the rotatable drivable unit 2, wherein lower ends 13a,b of cutting elements 4 in a radial inner section 7 are mainly positioned in a plane 10 substantially transversely to the rotation axis A of the rotatable drivable unit 2, while lower ends 13a,b of cutting elements 4 in a radial outer section 8 are mainly positioned in a downwardly tapered surface 9 having a symmetry axis coinciding with the rotation axis A of the rotatable drivable unit 2. The cutting elements 4 in the radial inner section 7 provide a flat bottom part 10 of the hole, in a plane P substantially transversely with respect to the rotation axis A, while the cutting elements 4 in the radial outer section 8 provide a downwardly tapered surface 9. As a result, lower ends of the cutting elements 4 subscribe, during rotation around the central axis A, a truncated cone surface, thereby providing a hole having a truncated cone surface.

As shown in FIGS. 1 and 2, the substantially radially extending lines 5a,b are mainly spirally shaped, when seen from a top view, so that ground particles that have been released from the soil, can easily be removed radially outwardly. Thereto, the lines 5a,b are curved radially backwardly when seen in the rotation direction R. As an alternative, in order to simplify the structure of the bore, instead of applying mainly spirally shaped lines, the lower ends of cutting elements may be positioned along a straight line. It is noted that in another embodiment according to the invention, the multiple number of cutting elements are arranged along lines that are mainly spirally shaped in the opposite circumferential direction. Then, the preferred rotation direction of the drill is the rotation direction opposite to the rotation direction R shown in FIG. 2.

Figure 4:
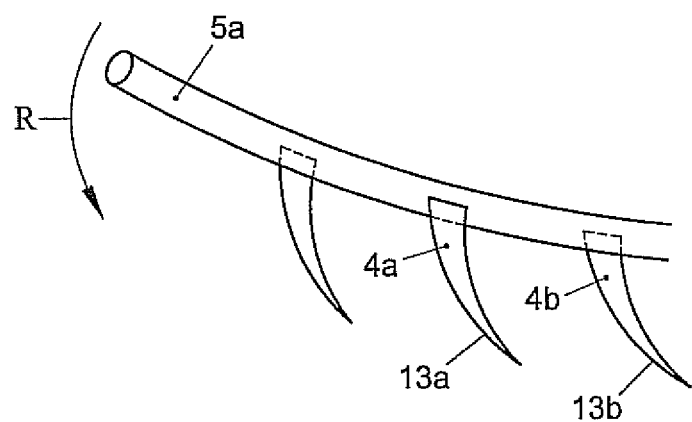
FIG. 4 shows a schematic perspective view in detail of cutting elements provided on the drill shown in FIG. 1.

FIG. 4 shows a schematic perspective view in detail of three cutting elements 4a,b provided on the drill 1. The cutting elements 4a,b provided with the lower ends 13a,b are mounted along the radially outwardly extending line 5a, here implemented as a tube frame 5a. The lower ends 13 of the cutting elements 4 are backwardly tilted so that drilling forces can be guided towards the axle 6 in a more stable manner, thereby improve the drilling effect of the drill 1. In another embodiment, however, the lower ends 13 of the cutting elements 4 are oriented substantially parallel to the rotation axis A.

In the shown embodiment, the drill 1 comprises two radially outwardly extending lines 5a,b. However, as indicated in FIG. 2 by the dashed lines 5c,d, also another number of radially outwardly extending lines can be applied, viz. four lines, along which cutting elements are positioned. Preferably, the multiple number of lines are substantially evenly distributed in the rotation direction R, so that the drill 1 may operate in a more or stable position wherein drilling forces are evenly exerted on the central axle 6 of the drill 1. Further, in principle, the cutting elements can also be arranged along a single line extending radially outwardly. In order to avoid heavy wear of the cutting elements 4, lower ends 13 of the cutting elements 4 are formed from hardened material, such as hardened steel, diamante or carbon particles.

As can be seen in FIG. 2, corresponding cutting elements 4, when viewed in the rotation direction R, positioned along different radial lines 5a,b, have a slightly different radial offset. As an example, cutting elements positioned along a first line 5a at a radial offset along circles c1, c2 with respect to the rotation axis A, have a slightly different radial offset than corresponding cutting elements along a second line 5b. Preferably, the radial offset of corresponding cutting elements is slightly greater at subsequent lines 5a,b. When rotating the drill 1 along the rotation axis A, ground particles are thus subjected to a force having a radially outwardly component, thereby providing an improved radial removal of the released ground particles, especially when the cutting elements are positioned along more than two lines 5a,b.

As can also be seen in FIGS. 2 and 4, a series of multiple cutting elements 4 are arranged in a zigzag profile along a substantially radially extending line 5, thus providing an improved force balance exerted on the carrying structure 3. Instead of arranging the cutting elements 4 in alternating order along the line 5, cutting elements can be positioned on a front side of the line 5.

The shown embodiment of the drill 1 further comprises, as an option, soil removing elements, implemented as soil guiding modules 14a,b, arranged behind corresponding radially extending lines 5a,b, seen in the rotation direction R. The passive soil guiding modules move the released soil particles radially outwardly. Alternatively or additionally, the soil removing elements may include an active module such as a conveyor belt. However, the drill 1 can also be provided with addition soil removing elements, since the cutting elements already contribute to a radially outwardly movement of the released soil particles and/or for saving manufacturing costs.

As a further option, the drill 1 includes a multiple number of cutting elements that are arranged at positions having a similar radial offset for forming a saw. By rotating the drill 1, these saw cutting elements generate a circular groove in the soil, thereby improving the drilling performance.

The drill 1 is shown in FIG. 1-4 is further provided with a number of cutting knifes 15a,b located at a position between cutting elements 4, between the radial inner section 7 and the radial outer section 8, the cutting knifes 15a,b extending lower than neighbouring cutting elements 4. The knifes 15a,b have a fixed radial offset regarding the rotation axis R and generate a circular groove marking a transition between said inner and outer sections 7, 8. Similarly, the drill 1 is provided with a multiple number of cutting knifes 15c,d located at a radial outer perimeter of the radial outer section 8, the cutting knifes 15c,d extending lower than neighbouring cutting elements. Upon rotation of the drill 1, the cutting knifes 15c,d define the outer perimeter of the drilled hole. It is noted that the number of cutting knifes 15a-d, both at the radial inner and outer border of the radial outer section 8 can range from 1 to a multiple number, such as 1 knife, 2 knifes, or 10 knifes.

In an advantageous embodiment according to the invention, the drill 1 further includes a separate drilling element 19 for drilling a plant hole. The separate drilling element 19 can e.g. be located right below the axle 6 or can be positioned at another location, e.g. in the radial inner section 7 having a non-zero offset radial offset. The separate drilling element is either fixed to the carrying structure 3 or can be operated independently of rotation of the main drill 1.

Figure 5:
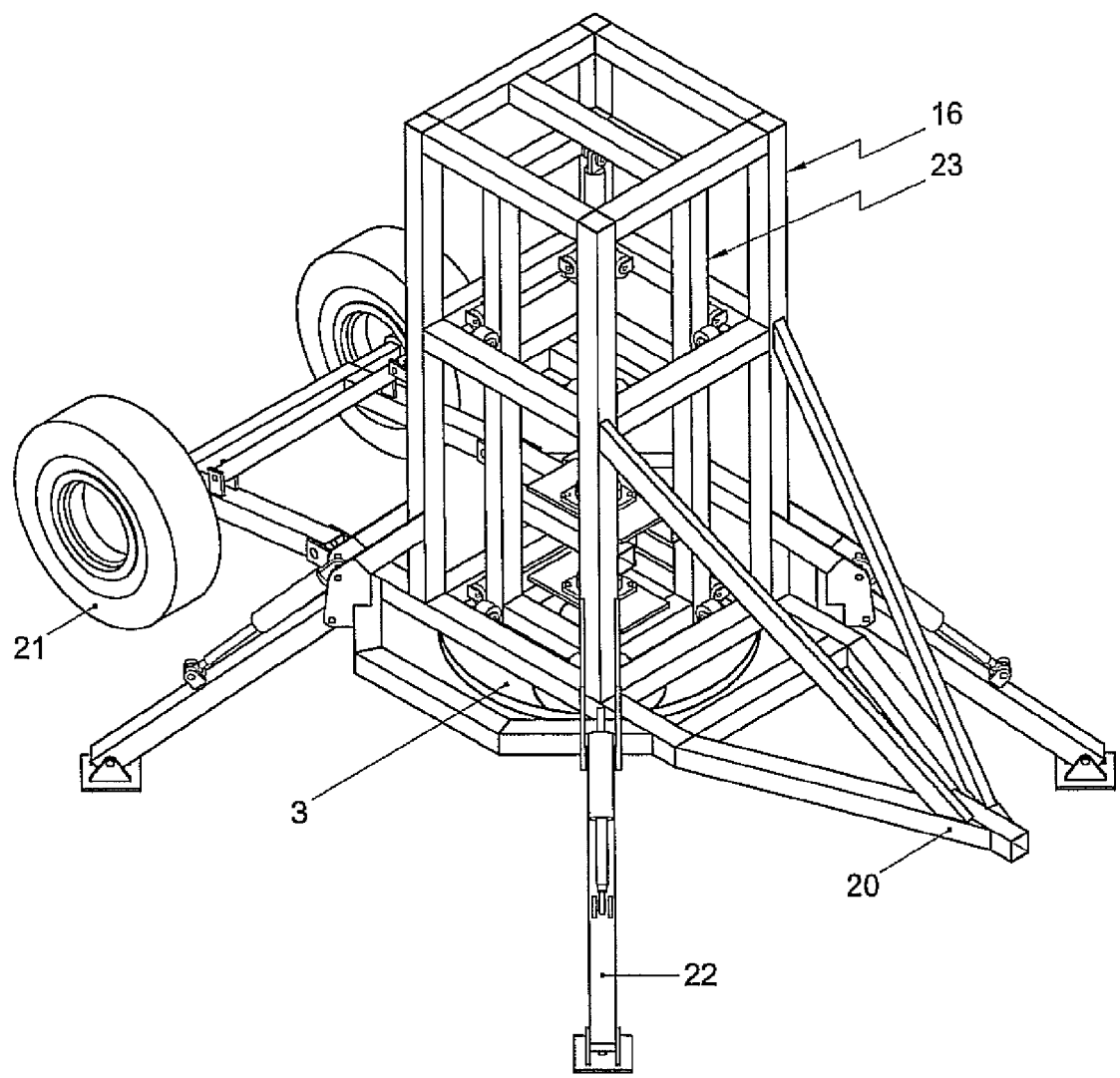
FIG. 5 shows a schematic perspective view of a first embodiment of the frame of the drill shown in FIG. 1.
Figure 6:
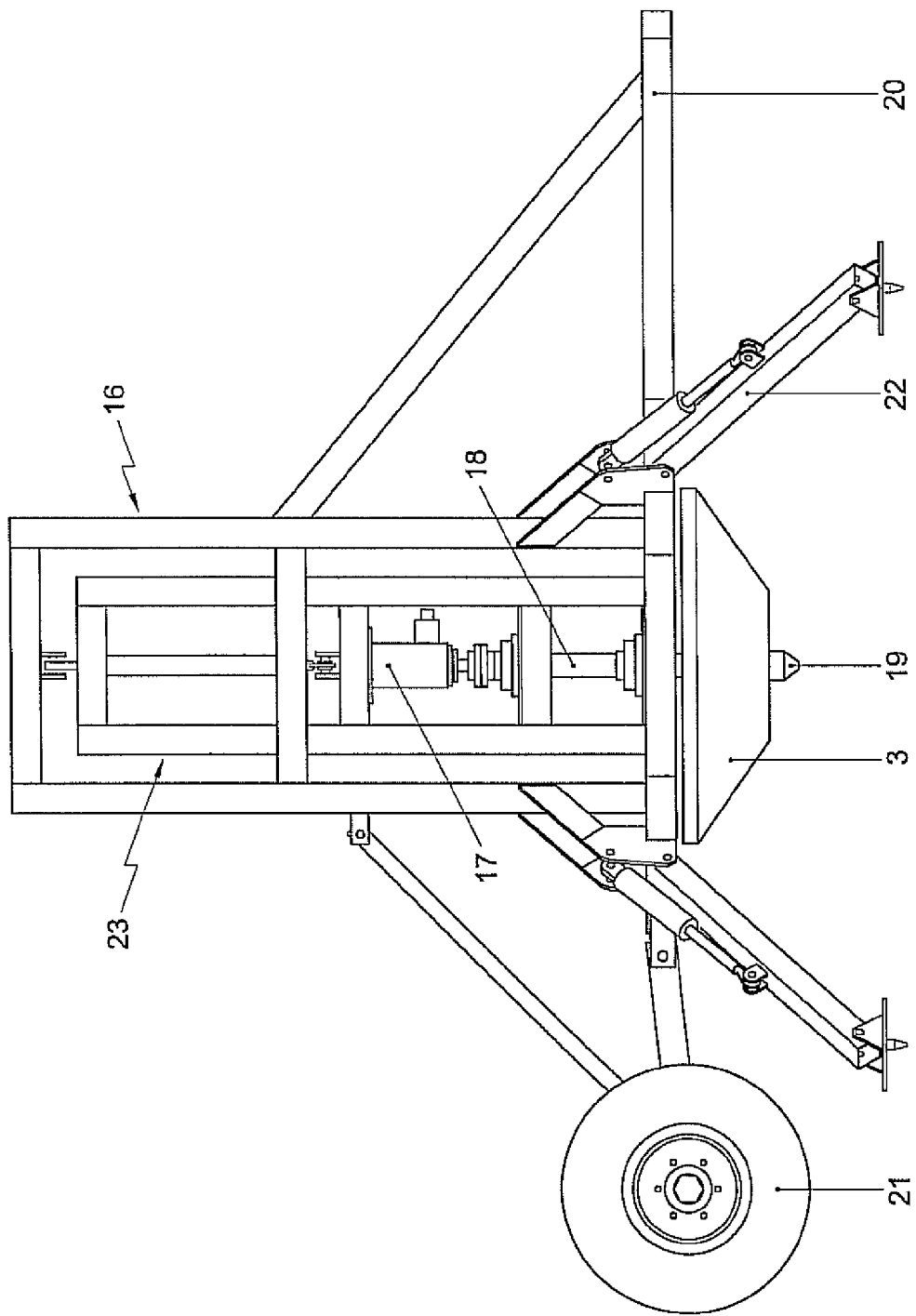
FIG. 6 shows a schematic side view of the frame of FIG. 5.

FIG. 5 shows a schematic perspective view of a first embodiment of a frame 16 of the drill 1. In FIG. 6, a schematic side view is shown. The frame 16 is arranged for carrying the rotatable drivable unit 2. For the purpose of supporting the frame 16 to the soil, and for balancing the frame 16 in a mainly horizontal manner, supporting elements 22 are provided. Alternatively or additionally, other elements, such as wheels 21 that can be fixed in a desired vertical position, can serve as supporting and balancing elements. As an option, the supporting elements 22 can be retracted during storage or transport of the drill 1. Further, the frame is provided with transport elements such as wheels 21 and a coupling element 20 for coupling with a car, truck or other pulling vehicle. Another variant of the drill 1 according to the invention includes a motor for driving the wheels 21 and/or the drill 1, so that the drill can move and turn autonomously over the field. However, the drill 1 can also be arranged for being moved by e.g. hand force or a working animal.

In the frame 16, a balancing structure 23 is included for balancing the rotatable drivable unit 2, so that the hole to be drilled is oriented mainly vertically, thereby in a hole having a mainly horizontal bottom. The drill 1 can then also be used in inclined regions, such as hills or mountains. The balancing structure may include a passive evening system. However, in principle, also other balancing structures can be used, e.g. using an active electrically, hydraulically or pneumatically driven actuator. A driving axle 18 for rotatable driving the unit 2 is shown in FIG. 6. The drill 1 can further be provided with a vibrating element 17 for vibrating the cutting elements 4, thereby further improving the drilling performance.

Optionally, the frame is provided with additional mass elements for further stabilization and improvement of the drilling performance.

The operation of the drill 1 will be explained in more detail referring to FIG. 7-10.

Figure 7:
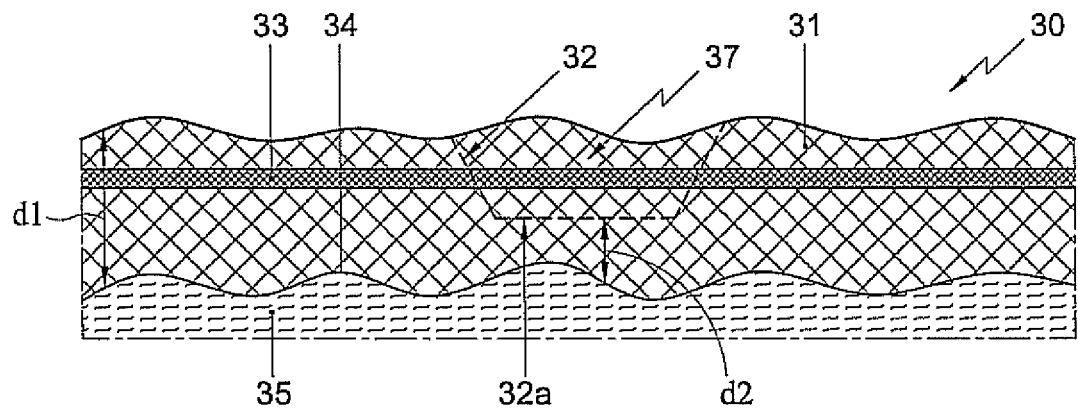
FIG. 7 shows a schematic side view of soil including a hardpan layer.

FIG. 7 shows a schematic side view of an area 30 wherein plants and/or trees are hardly or not at all present, such as eroded soils, rocks and deserts. The top layer 31 may include a soil covering a hardpan layer 33. Below the hardpan layer 33, fresh water 35 having a water level 34 is present. However, due to the presence of the hardpan layer 33, plants and/or trees can not reach the fresh water layer 35. A vertical distance d1 between the top layer 31 surface and the local water level 34 can be decreased by digging a hole 37 in the soil 31. According to an aspect of the invention, the hole 37 has a hole surface 32 formed as a truncated cone extending through the hardpan layer 33, so that the vertical distance d2 to the local water level 34 reduces significantly. The hole 37 is formed as a funnel having a flat bottom part. More importantly, since the hardpan layer 33 is broken, fresh water now becomes available for any plants to grow in the hole.

Figure 8:
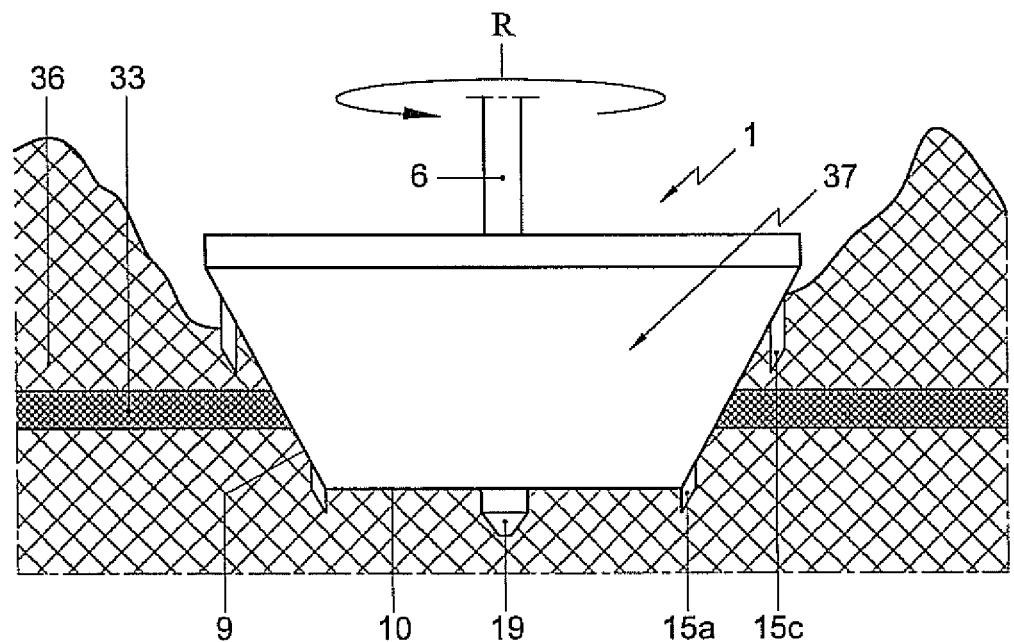
FIG. 8 shows a schematic side view of the soil of FIG. 7 wherein a drill according to the invention is applied.

FIG. 8 shows a schematic side view of the soil wherein a drill 1 according to the invention is applied. The drill rotates in the rotation direction R around the axle 6 and performs a downwardly drilling movement, thereby obtaining the hole 37 having a substantially flat bottom 10 and a tapered side wall 9, thus forming a truncated cone shaped hole 37. The hardpan layer 33 is locally removed. The released soil particles are removed radially outwardly to form an annular shaped pile of soil particles 36. Thus, according to an aspect of the invention, a hole 37 is drilled in the soil, through the hardpan layer 33, the hole 37 having downwardly tapered side walls 32b and a substantially flat bottom surface 32a.

Figure 9:
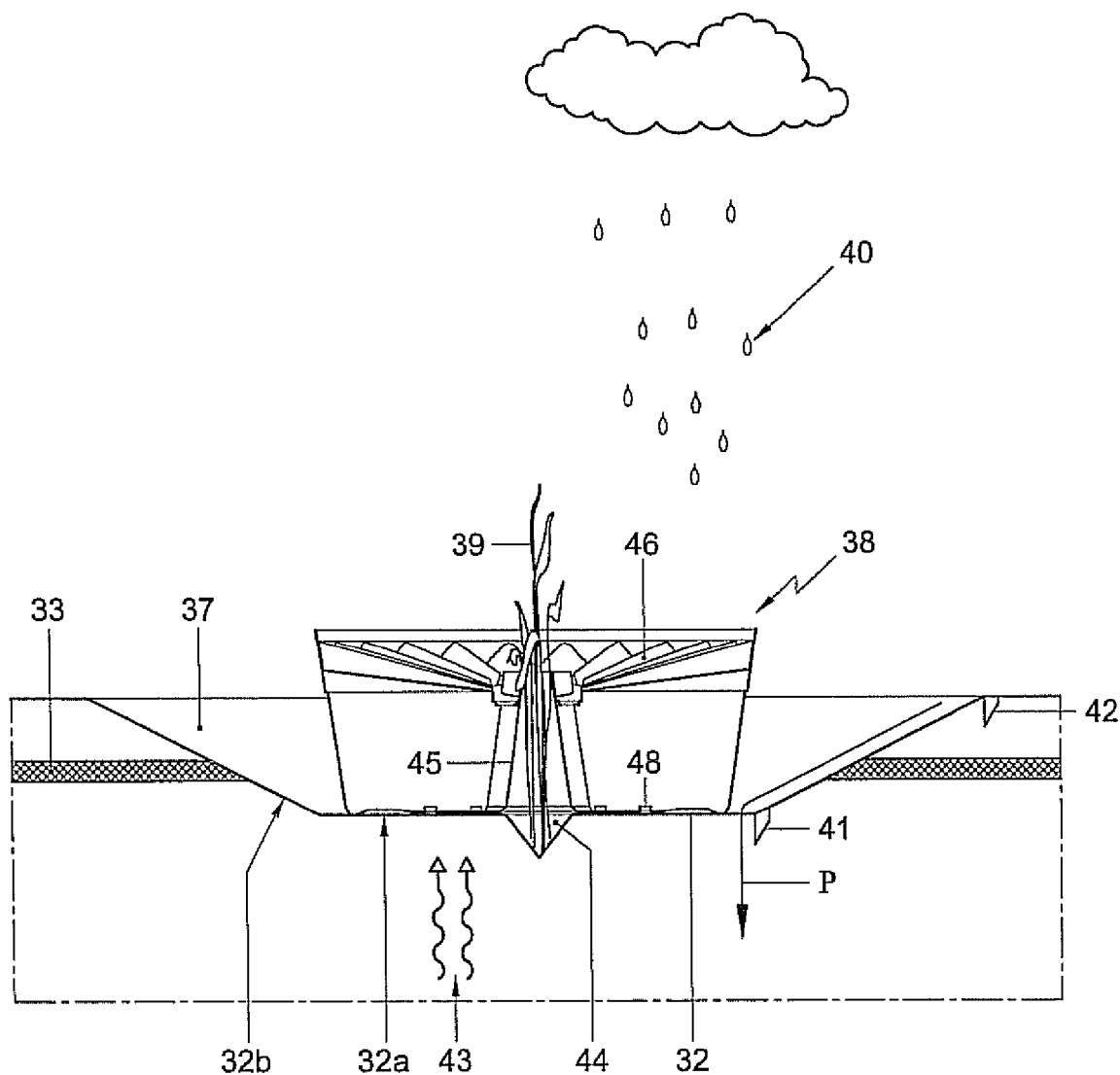
FIG. 9 shows a schematic side view of the soil of FIG. 7 wherein a plant is planted.

FIG. 9 shows a schematic side view of the soil wherein the hole 37 has been realized and a plant 39 has been planted. The plant 39 is planted in the substantially flat and horizontal bottom surface 32a, in particular, in the central hole 44 generated by the separate drilling element 19. The plant 39 is surrounded by a plant protection box 38 including a tube 45 surrounding the plant stem at least partially sideways, a water receiving surface 46, a water reservoir 47 and irrigation means 48 for providing the soil with water from the water reservoir. A description of such a plant protection box 38 can e.g. be found in patent publications WO 2006/132526, WO 2009/078721 and NL 2 003 479 in the name of the applicant. It is noted that also other plant protection systems can be applied. After planting the plant 39 and positioning the plant protection box 38, soil particles from the annular shaped pile of soil particles 36 are moved to the hole above the sloped side surface 32b and around the box 38. By refilling the hole with soil, at least above the downwardly tapered side walls 32b, the box 38 and the plant in the subsoil is stabilized.

During growth of the plant 39, rain droplets 40 and other moisture that is present in the atmosphere is collected by the water receiving surface 46, stored in the water reservoir 47 and irrigated to the soil. Water is also received on the sloped side surface 32b. Due to the drilling activities, the hole gets slopes, so that the water flows via the sloped side surface 32b along a path P towards a circular groove 41 that has been arranged at the perimeter of the bottom 32a. Via said groove 41 the water penetrates the soil thereby reaching the root structure of the plant 39. Due to the specific flow path along the sloped surface 32b and the relatively large area, in top view, of the hole 37, a relatively large amount of water becomes available for moistening the plant root structure.

It is noted that instead of planting a plant, also a bush, tree or a seed can be planted in the hole. Further, two or more plants, trees and/or seeds can be planted. Thereto, the drill can be provided with more than one separate drilling elements, e.g. three separate drilling elements.

Further, a second circular groove 42 has been arranged at the perimeter of the side wall 9, thereby counteracting that the root structure of the plant is exposed to an excess of incoming water.

Via a capillary structure, also fresh ground water 35, 43 becomes available for the plant root structure. By using a drill having a truncated bottom part, the thickness of the capillary structure at the bottom 32a of the hole is relatively small, so that the ground water can reach the roots after a first growth of the roots. However, due to the capillary structure along the entire bottom of the hole, including the tapered sections, ground water in a capillary column centered with the rotation axis A can not evaporate, thereby preventing unnecessary water loss.

Figure 10:
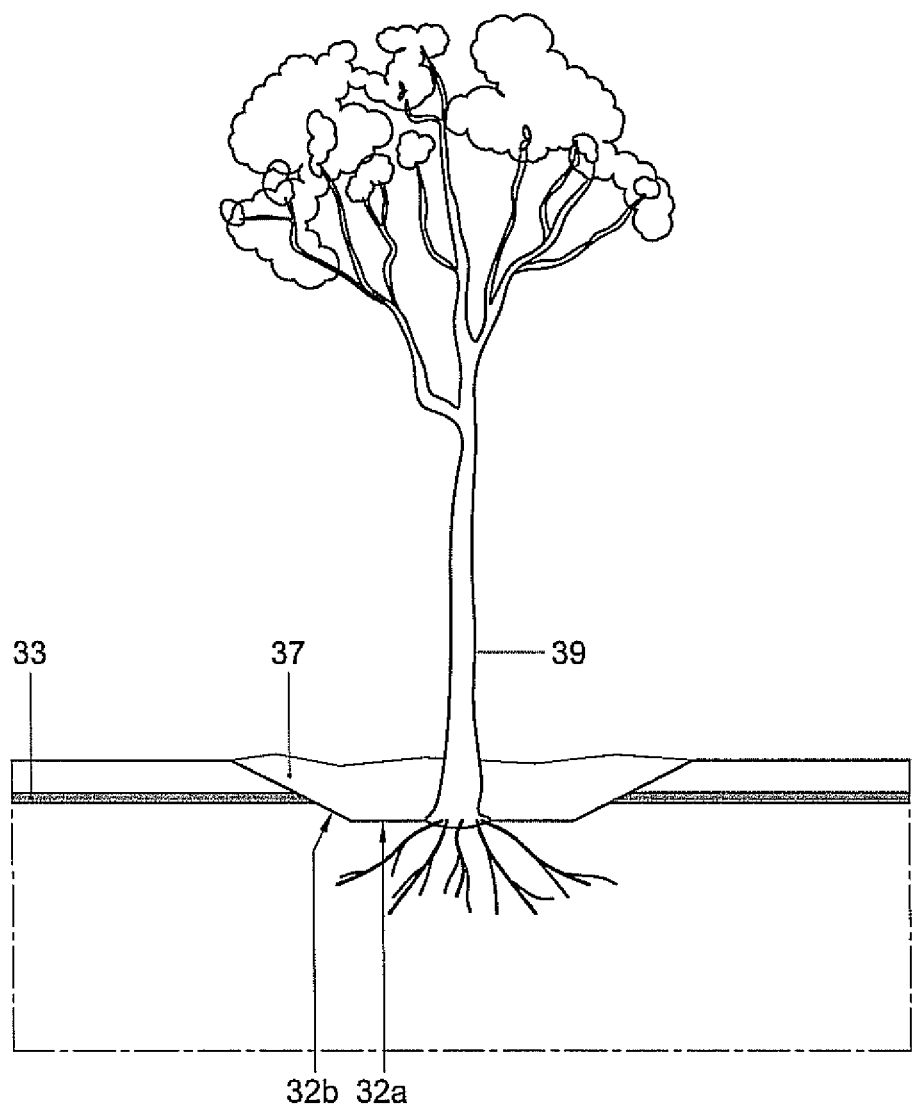
FIG. 10 shows a schematic side view of the soil of FIG. 7 wherein a tree has grown.

FIG. 10 shows a schematic side view of the soil wherein a tree 39 has grown from the plant. Since the root structure has also grown, the tree is now able to find water sources without artificial means.

By applying the drill according to the invention, plants, bushes, seeds and trees can be planted in regions that currently do not provide enough water for the organisms to survive, such as in sand deserts, thereby opening the opportunity to plant even woods.

Further, the drill according to the invention can be used in moderate climate regions, e.g. for the purpose of removing harmful, overgrowing and/or undesired flora, such as weeds, nettles, field thistles or blackberries.

Figure 11:
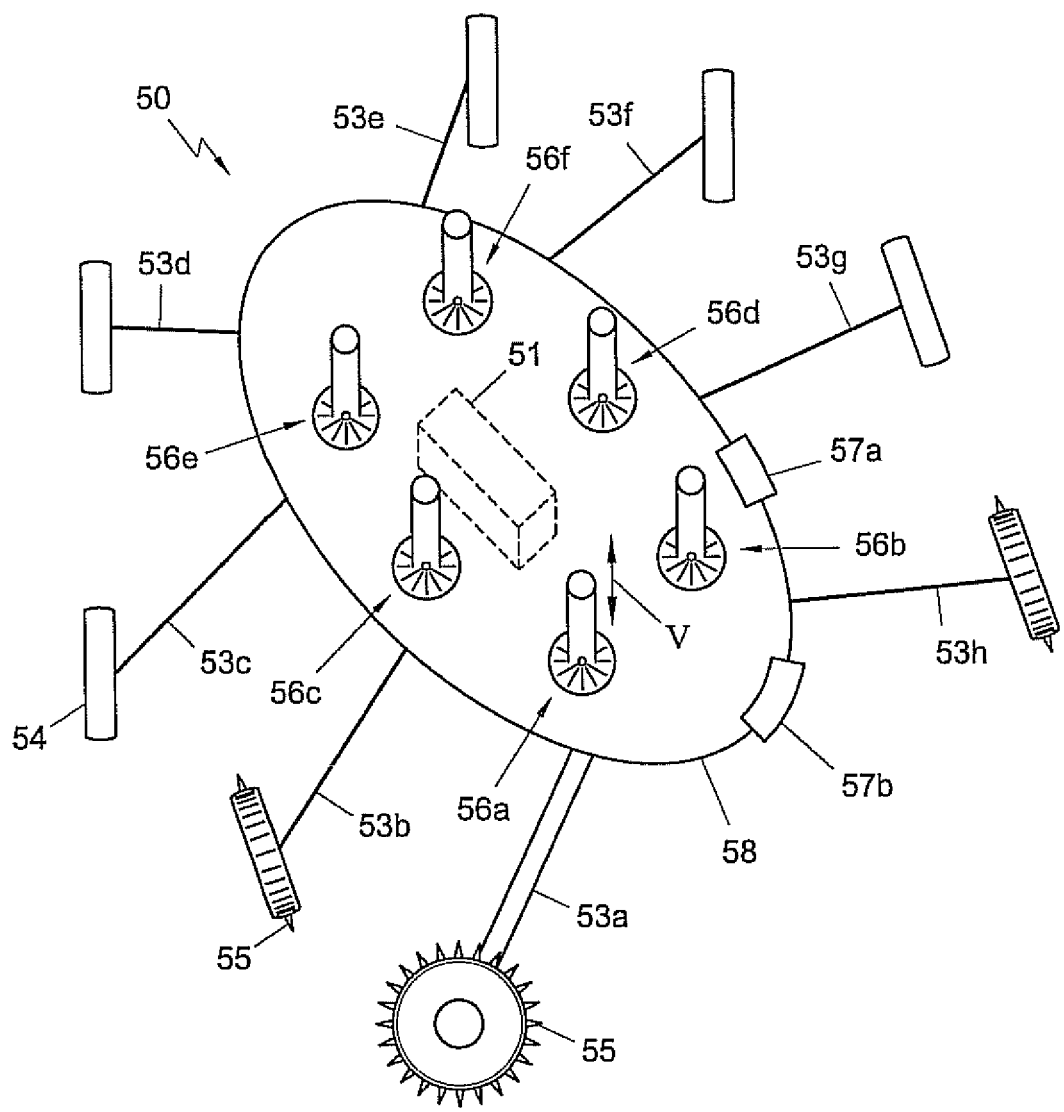
FIG. 11 shows a schematic perspective view of a vehicle including a multiple number of drills according to the invention.

FIG. 11 shows a schematic perspective view of a spider shaped vehicle 50 including a multiple number of drills 56 according to the invention. The vehicle comprises a motor 51 suspended in the vehicle's chassis 52, preferably at the bottom of the chassis 52 to obtain a low centre of gravity. The motor is arranged for autonomously driving the vehicle 50. In addition, the vehicle 50 comprises eight wheels 54 mounted on corresponding bearing arms 53a-h that are connected to the chassis 52. The arms have at least one degree of freedom. In the shown embodiment, the length of the arms 53 is adjustable, e.g. using telescopic movable arm segments. Thereto, the arms include an actuator, e.g. a hydraulic actuator for adjusting the length of the arm. In a top view, the chassis has a smooth side contour 58, e.g. an ellipsoidal or a circular contour, and the wheel arms 53 are substantially uniformly distributed over said side contour 58 to provide a stable vehicle 50, also in uneven areas, such as rockets, or on sloped surfaces.

In order to render the vehicle 50 even more flexible in moving on rough terrain, the arms may have further degrees of freedom. As an example, the arms 53 may be arranged to be also adjustable in a vertical direction.

Figure 12:
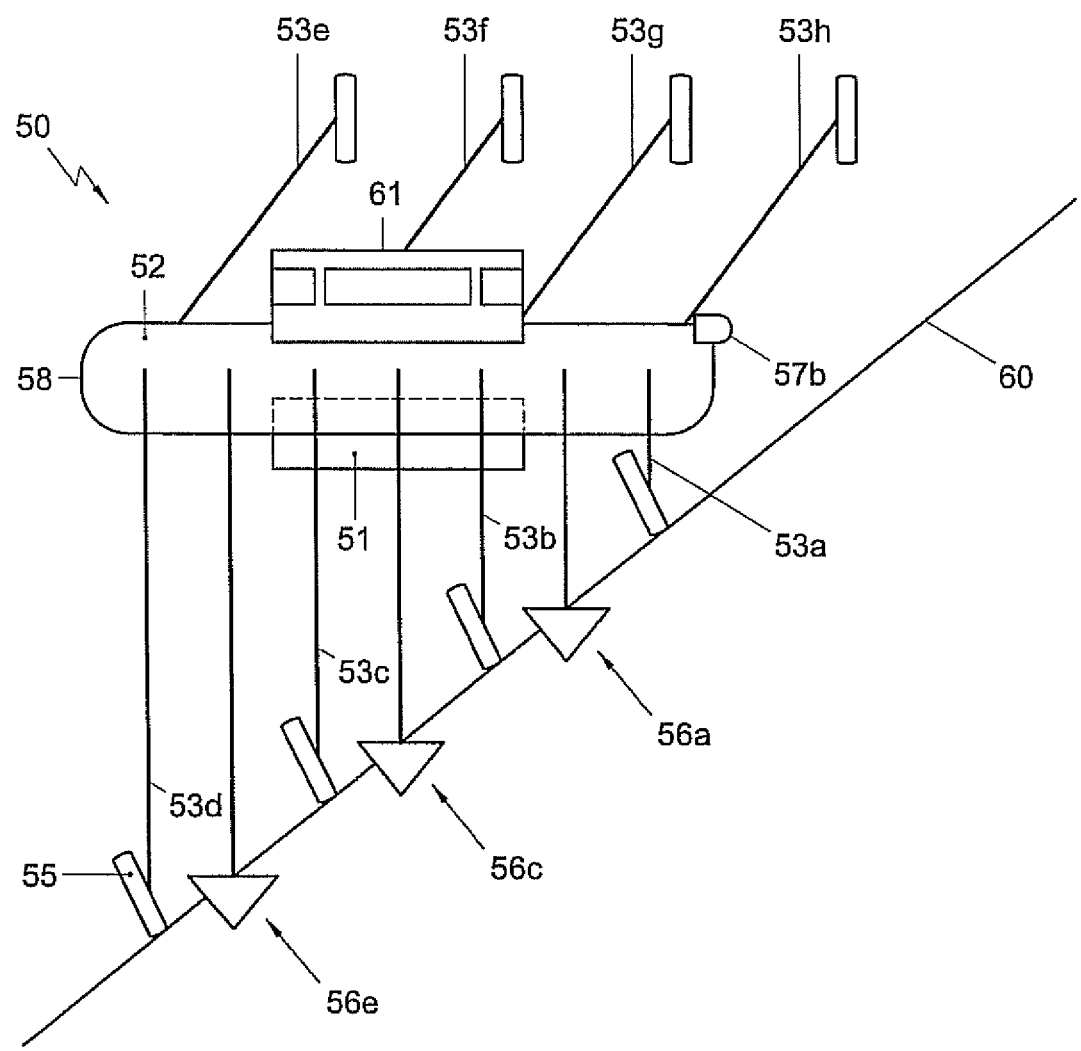
FIG. 12 shows a schematic side view of the vehicle of FIG. 11.

As shown in FIG. 11, the wheels 54 are provided, at their outer perimeter, with spikes 55 or other protruding elements to enhance the grip on the ground surface. Due to the edge-shaped spikes 55, the vehicle has an increased grip on sloped surface, see e.g. FIG. 12 showing a schematic side view of the vehicle 50 moving on a mountain hill 60. It is noted that in another embodiment, the wheels 54 include standard tires having smooth outer surfaces, e.g. for application in less rough terrain. Preferably, the orientation of all wheels 54 can be adjusted so that each wheel can steer. In addition, preferably, all wheels are drivable, both in forward and backward direction, either by the central motor 51 or by decentralized driving units, e.g. electro motors. Due to the stable and versatile structure of the vehicle 50, sliding along, falling in and capsizing into rough or inclined surfaces is counteracted. For application in a loose surface, e.g. sand, the wheels 54 can optionally be provided with additional gripping elements such as cage wheels.

As an option, the vehicle 50 is provided with a single or a multiple number of balance elements 57a,b movably arranged on the side contour 58 of the vehicle, thereby providing a further means for additionally improving the stability of the vehicle. Preferably, the balance elements 57 are positioned at a highest point on the side contour 58 of the vehicle. In an advantageous embodiment according to the invention, the single or multiple number of balance elements 57a,b move dynamically and automatically to an actual highest point on the side contour of the vehicle, e.g. by using an actuator for moving the balance elements triggered by inclination sensor data, so that stability of the vehicle is further improved and a chance of toppling over further reduces.

Further, the vehicle 50 includes six drills 56a-f according to the invention, each including a rotatable drivable unit that is vertically movable in a vertical direction V to generate partially tapered holes in the ground, as described above. The vehicle can also be provided with another number of drills 56 according to the invention, e.g. more than six drills such as eight drills, or less than six drills such as four drills or two drills. Advantageously, also the one or more drills 56 are arranged at a bottom side of the vehicle, in a lower section of the chassis 52, thus contributing to a low centre of gravity and increased stability of the vehicle.

As shown in FIG. 12, the vehicle further includes a cab 61 for the driver of the vehicle. Preferably, the cab 61 is arranged on the chassis 52 such that it can swivel or entirely rotate on a vertical axis for optimal view of the driver.

Advantageously, the vehicle is further provided with a navigation system including information of local inclination of the ground surface. Preferably, the navigation system activates a warning signal if the vehicle approaches an area having a steeper slopes than can safely be passed by the vehicle. The warning signal can activate a visual and/or audible signal to warn the driver, and/or can intervene in a driving system of the vehicle.

In order to get a navigation system provided with local ground surface inclination information, a digital map can be produced using picture based information. In the digital map, planting positions can be determined and the individual drill (s) can be activated when the vehicle arrives at the thus determined plant positions. Thereto, the driving system of the vehicle can operatively be connected to said navigation system.

During operation of the drills 56 of the vehicle 50, a first number of drills rotate in a first rotation direction while a second number of drills rotate in a second, opposite rotation direction. Preferably, the first number of drills coincides with the second number of drills, so that the position of the vehicle remains stable. Preferably, the vehicle detects when the individual drills contact the ground surface, e.g. using contact sensors at the drills. In an advantageous embodiment the drilling procedures includes a step of waiting until all drills to be activated contact the ground before they start exerting substantial forces on the ground simultaneously, thereby further improving the stability of the vehicle.

Figure 13:
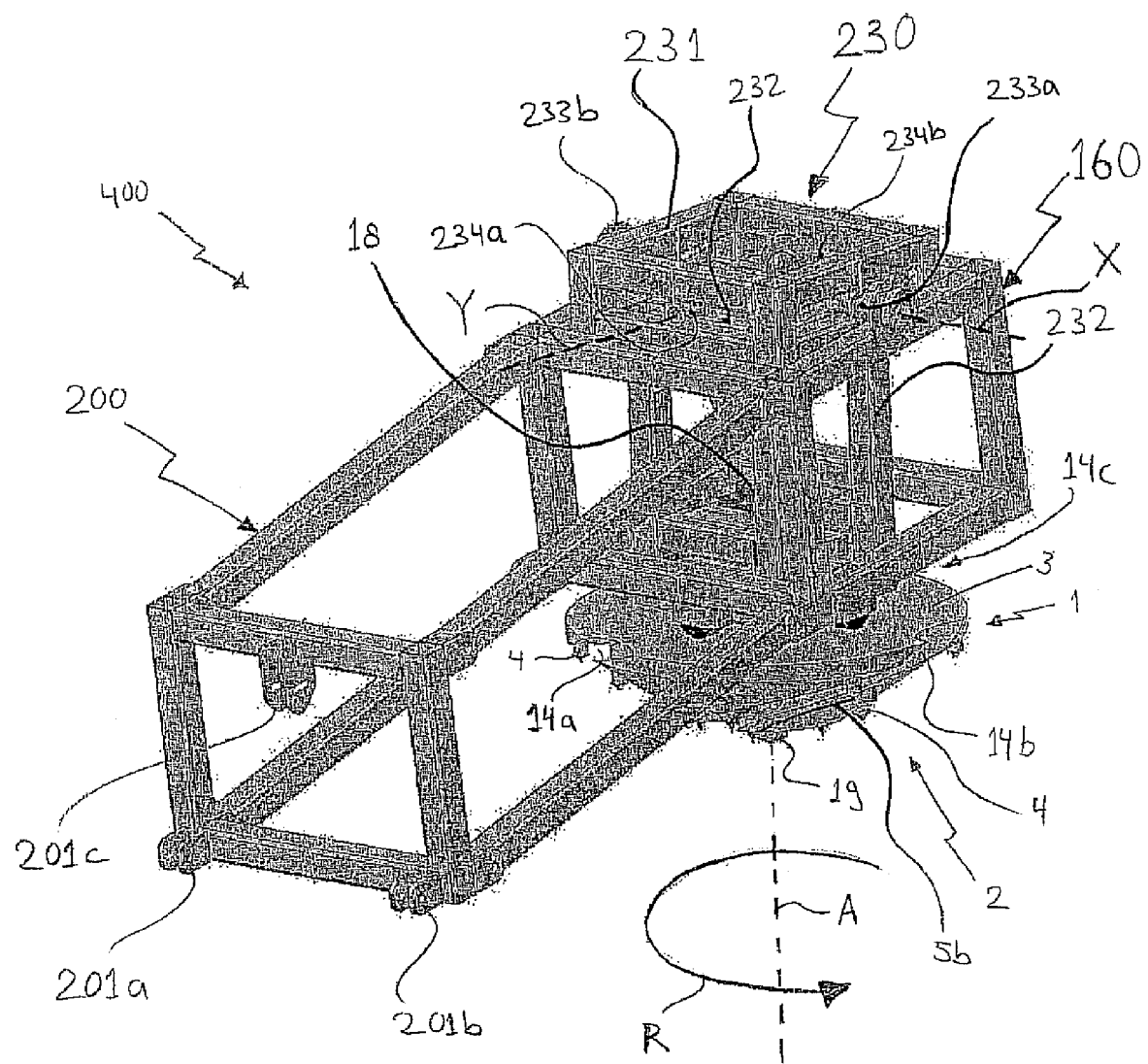
FIG. 13 shows a schematic perspective view of a further embodiment of the frame of a further embodiment of the drill according to the invention.

FIG. 13 shows a schematic perspective view of a further embodiment of the frame 160 of a further embodiment of the drill 1 according to the invention. The frame may be part of a vehicle, e.g. a self propelling vehicle. Alternatively, the frame 160 may be part of an implement 400, e.g. an implement arranged for being carried by a carrying vehicle, such as a tractor. For example, the implement 400 may be arranged for be carried at the front, a side, and/or the back of the carrying vehicle. In the further embodiment, the drill 1 comprises three radially outwardly extending lines, of which one line 5b is shown. However, also another number of radially outwardly extending lines can be applied, e.g. two or four lines, along which the cutting elements 4 are positioned.

The shown further embodiment of the drill 1 further comprises, as an option, three soil removing elements, implemented as soil guiding modules 14a, b, c, arranged behind corresponding radially extending lines 5a, b, c with cutting elements 4 seen in the rotation direction R. However, a drill 1 comprising a first soil removing element behind a first radially extending line with cutting elements 4, does not necessarily comprise a further soil removing element behind every further radially extending line with cutting elements 4.

In FIG. 13 the passive soil guiding modules 14a, b, c each comprise a groove 14a, b, c. Alternatively or additionally, one or more of the passive soil guiding modules may comprise one or more other elements, such as a rib or flange. Besides, as described above, the soil removing elements and/or the drill 1 may include an active module and/or a multiple number of cutting elements that are arranged at positions having a similar radial offset for forming a saw.

As shown in FIG. 13, the soil removing element 14b is substantially radially extending behind the substantially radially extending line 5b. One or a multiple number of the soil removing elements 14a, b, c may be mainly spirally shaped, when seen from a top view, so that ground particles that have been released from the soil, can easily be removed radially outwardly. Thereto, the soil removing elements 14a, b, c may be curved radially backwardly when seen in the rotation direction R. As an alternative, e.g. in order to simplify the structure of the bore, instead of applying mainly spirally shaped grooves, ribs and/or other soil removing elements, the soil removing elements 14a, b, c may be positioned along a straight line. It is noted that in another embodiment according to the invention, e.g. the embodiment wherein the multiple number of cutting elements 4 are arranged along lines that are mainly spirally shaped in the opposite circumferential direction, the soil removing element may be mainly spirally shaped in the opposite circumferential direction as well. Then, the preferred rotation direction of the drill is the rotation direction opposite to the rotation direction R shown in FIG. 13.

Besides, a balancing structure 230 may be provided within the frame 160, e.g. for balancing the rotatable drivable unit in a horizontal plane, and/or e.g. for putting and/or keeping e.g. the driving axle 18 and/or the drill into/in a substantially vertical position. For example, the balancing structure 230 may comprise two balancing elements, such as two balancing frames 231,232. A first balancing frame 231 may be pivotably connected to the frame 160, and may be rotatable around a second rotation axis Y, preferably substantially transverse to the first rotation axis A. The first balancing frame 231 may therefore e.g. be hingedly connected to the frame 160, e.g. by one or a multiple number of hinges 233a,b.

Within the first balancing frame 231a second balancing frame 232 may be pivotably connected. The second balancing frame 232 may be rotatable around a third rotation axis X, preferably substantially transverse to the first rotation axis A and preferably substantially transverse to the second rotation axis Y. Therefore, the second balancing frame 232 may e.g. be hingedly connected the first balancing frame 231, e.g. by one or a multiple number of hinges 234a,b.

By applying the balancing frame structure, also called gimbals, the rotatable drivable unit is oriented transversely with respect to the direction of the gravity force, independently of the orientation of the outer frame 160.

Alternatively or additionally, another balancing structure may be provided, such as a ball shaped joint acting like a ball and socket joint, or a pivotable suspension providing two degrees of freedom to the rotatable drivable unit 2 and/or the driving axle 18 for rotatable driving the unit 2. Such a balancing structure may be an active balancing structure, but may alternatively be a passive balancing structure.

As shown in FIG. 13, the frame 160 may comprise one or a multiple number of coupling elements 201 for coupling with a car, truck or other carrying vehicle. For example, the frame 160 may comprise a carrying arm 200 or carrying element 200 for carrying the rotatable drivable unit 2 at a distance from the carrying vehicle. The coupling elements 201a, b, c may be arranged to be attachable to standard attachment means of a carrying vehicles, such as a standard Quick Hitch and/or a standard three-point linkage, of e.g. a tractor.

For the purpose of additionally supporting the frame 160 and/or the implement 400 to the soil, preferably during drilling, supporting elements may additionally be provided at the frame 160 and/or at the implement 400. Alternatively or additionally, other elements, such as wheels, can serve as supporting and/or balancing elements. Optionally, all or a part of the supporting elements can be retracted during storage or transport of the drill 1.

Figure 14:
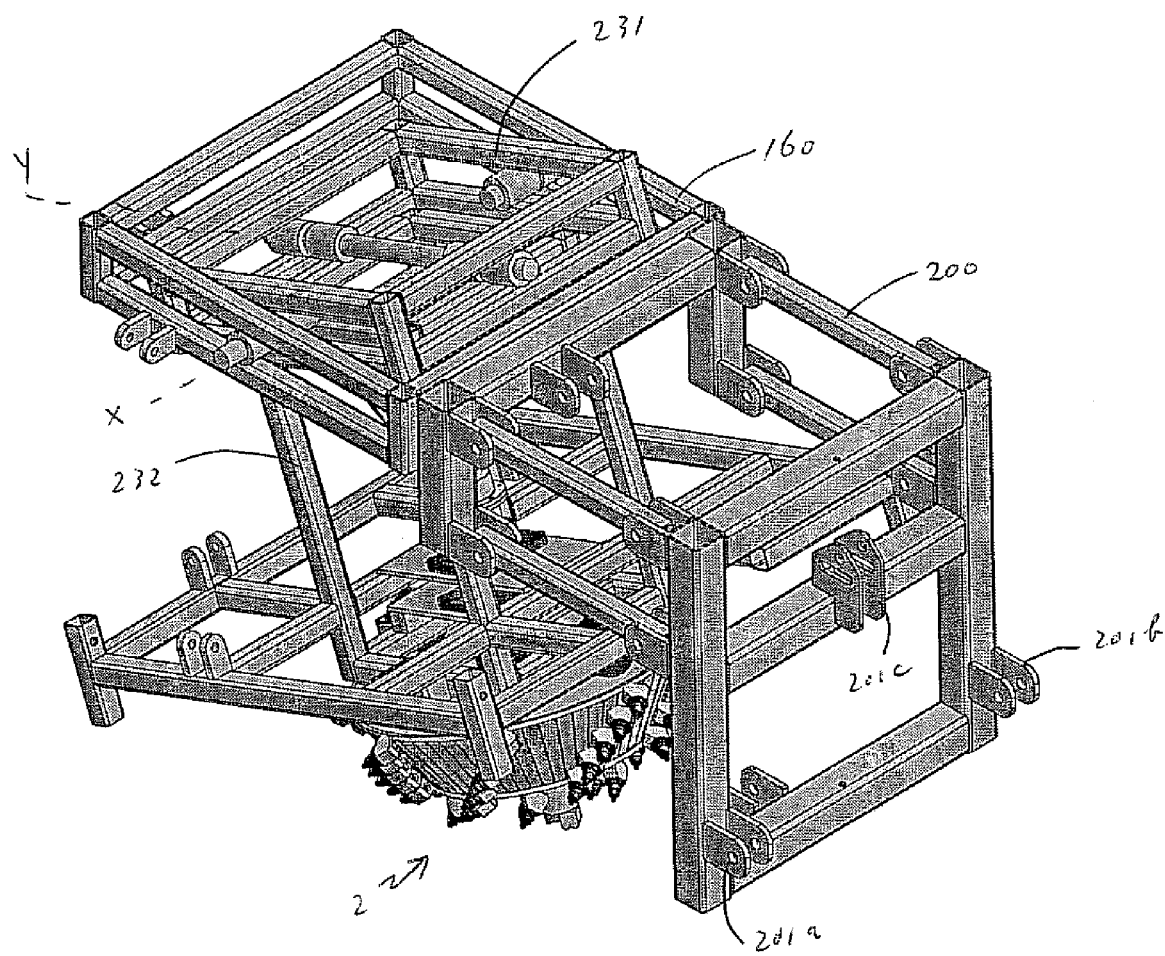
FIG. 14 shows a further schematic view the frame of FIG. 13.

FIG. 14 shows a further schematic perspective view of the frame of FIG. 13.

According to a further aspect of the invention, the balancing structure is provided with a locking mechanism for fixing a specific orientation of the drill. Then, the orientation of the drill is maintained, also during drilling operations, so that a hole having a desired orientation with respect to the gravity direction is obtained. Turning or tilting of the drill is then counteracted.

FIG. 15a shows a further schematic view the frame of FIG. 13. The frame including a locking mechanism for fixing the orientation of the rotatable drivable unit. The locking mechanism includes a multiple number of chains or ropes 250 that are, at one end 250a, fixed to a the second balancing frame 232, preferably at a lower section thereof. The other, second end 250b of the chains or ropes 250 slides via a pulley 251, attached to the frame 160, and is provided with a mass 252. Due to the mass 252, e.g. 20 kg or more, the chains or ropes 250 are tightened. The locking mechanism further includes a blocking element for blocking any sliding of the chains or ropes 250 along the pulley 251. Then, the distance between the first end of the chains or ropes 250 with respect to the respective pulley 251 can not increase anymore. Since, the second balancing frame 232 is provided with a multiple number of ropes or chains 250, at various locations, the orientation of the rotatable drivable unit, and the drill is fixed.

As an example, the blocking element includes a pen that can be driven in an opening enclosed by a chain link.

In a preferred embodiment, the second balancing frame 232 is provided with two pairs of ropes or chains 250 for providing fixation with respect to the X-axis, and two pairs of ropes or chains 250 for providing fixation with respect to the Y-axis. The first ends of a pair of ropes or chains 250 are connected to the second balancing frame 232 at opposite locations. In a specific embodiment, a pair of ropes or chains 250 is integrated in a single rope or chain by connecting the respective first ends 250a and providing pulleys at the second balancing frame 232, preferably at the lower sections thereof, for guiding the rope or chain. In principle, also a single pair of ropes can be applied for fixation with respect to a specific rotation axle.

In preparing the drill for operation, the drill is lowered at a desired drill location. The balancing mechanism enables the drill to have a desired orientation, i.e. with its central axis A parallel to the gravity direction. Then, the orientation of the drill is fixed by operation of the locking mechanism, i.e. by blocking any sliding of the chains or ropes 250 along the pulley 251. Since the drill orientation is now fixed, the drill is ready for drilling the hole.

As an alternative to chains or ropes 250, the locking mechanism may include other fixation means, e.g. a lockable bars or lockable telescoping tubes. Further, the locking mechanism can be provided with blocking elements that are operable by hand, such as a pen, or blocking elements that are machine operable, e.g. hydraulic elements.

Figure 15B:
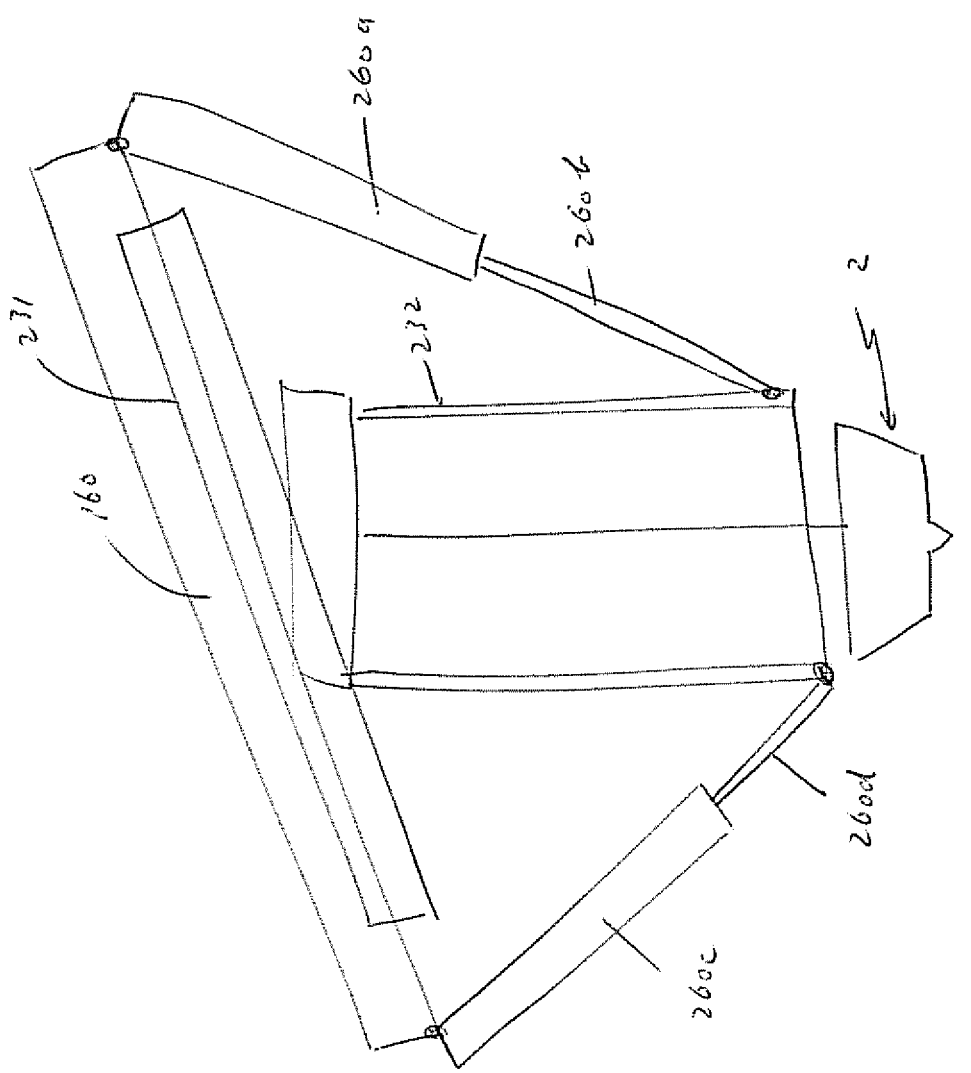
FIG. 15b shows a schematic view of an alternative frame.

FIG. 15b shows a schematic view of an alternative frame. Here, the locking mechanism includes telescoping tubes 260.

FIG. 15c shows a schematic view of a further alternative frame. Here, the locking mechanism includes telescoping tubes 260 provided with a pen hole fixation mechanism. A locking pen 261 may fit into one of a number of holes 262 to fix the mutual position of the telescoping tubes 260. The pen hole fixation mechanism includes a spring 263 for driving the pen into the corresponding hole 262. The pen can be withdrawn e.g. by hand or an actuator for setting another mutual distance or for allowing mutual movement of the telescoping tubes. Here, in total, two pairs of telescoping tubes 260 are applied for fixing the orientation of the bore with respect to the horizontal plane.

Figure 16:
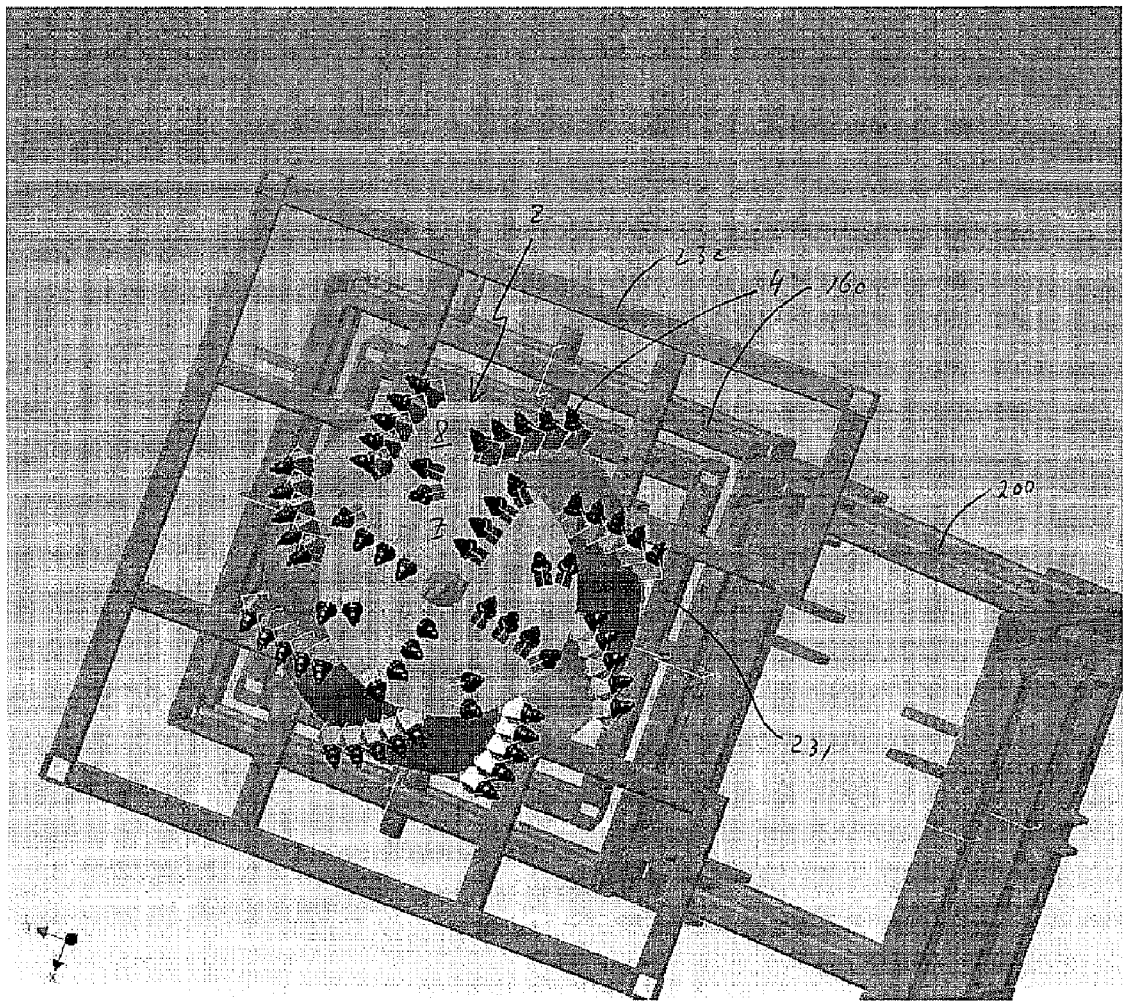
FIG. 16 shows a schematic view of the frame of FIG. 13 from below.

FIG. 16 shows a schematic view of the frame of FIG. 13 from below.

The invention is not restricted to the embodiments described herein. It will be understood that many embodiments are possible.

The frame construction including the balancing structure as described in view of FIG. 13 can be applied to another drill machine including the drill according to the invention. Specifically, the multiple number of drills provided on the vehicle that is described in view of FIG. 11 can be provided with such a balancing structure. As such, each drill can be oriented vertically, independently of the local position of the vehicle with respect to the ground, also if the vehicle is positioned on a slope. In principle, also a limited number of drills can be provided with a balancing structure, e.g. to save costs.

These and other embodiments will be apparent for the person skilled in the art and are considered to lie within the scope of the invention as defined in the following claims.

The invention claimed is:

1. A drill for realizing a partially tapered bore hole in a soil covering a hardpan layer, comprising a rotatable drivable unit that is provided with a carrying structure and a multiple number of cutting elements carried by the carrying structure, the multiple number of cutting elements being arranged along a line extending substantially radially and outwardly from a central axis of the rotatable drivable unit, wherein lower ends of cutting elements in a radial inner section are mainly positioned in a plane substantially transversely to the rotation axis of the rotatable drivable unit, while lower ends of cutting elements in a radial outer section are mainly positioned in a downwardly tapered surface having a symmetry axis coinciding with the rotation axis of the rotatable drivable unit, the radial outer section defining a relatively large area relative to the area defined by the radial inner section.

2. The drill according to claim 1, wherein the substantially radially extending line is spirally shaped.

3. The drill according to claim 1, wherein the multiple number of cutting elements carried by the carrying structure are arranged along a multiple number of lines substantially radially extending outwardly from the rotation axis of the rotatable drivable unit and substantially evenly distributed in the circumferential direction.

4. The drill according to claim 1, wherein lower ends of the cutting elements subscribe, during rotation around the central axis, a truncated cone surface.

5. The drill according to claim 1, wherein a series of multiple cutting elements are arranged in a zigzag profile along the substantially radially extending line.

6. The drill according to claims 1, further comprising soil removing elements operatively associated with the carrying structure.

7. The drill according to claim 1, wherein a multiple number of cutting elements are arranged at positions having a radial offset for forming a saw.

8. The drill according to claim 1, further comprising a vibrating element for vibrating a multiple number of cutting elements.

9. The drill according to claim 1, wherein the rotatable drivable unit is further provided with a cutting knife located at a position between cutting elements, between the radial inner section and the radial outer section, the cutting knife extending lower than neighboring cutting elements.

10. The drill according to claim 1, further comprising a separate drilling element for drilling a plant hole.

11. A vehicle, comprising a multiple number of drills according to claim 1.

12. The drill according to claim 1, wherein the rotatable drivable unit is further provided with a cutting knife located at a radial outer perimeter of the radial outer section, the cutting knife extending lower than neighboring cutting elements.

13. A drill for realizing a partially tapered bore hole in a soil covering a hardpan layer, comprising a rotatable drivable unit that is provided with a carrying structure and a multiple number of cutting elements carried by the carrying structure, the multiple number of cutting elements being arranged along a line extending substantially radially and outwardly from a central axis of the rotatable drivable unit, wherein lower ends of cutting elements in a radial inner section are positioned in a plane substantially transversely to the rotation axis of the rotatable drivable unit, while lower ends of cutting elements in a radial outer section are mainly positioned in a downwardly tapered surface having a symmetry axis coinciding with the rotation axis of the rotatable drivable unit, wherein the carrying structure includes a truncated cone surface.

\* \* \* \* \*